United States Patent [19]

Backu et al.

[11] Patent Number: 4,669,558
[45] Date of Patent: Jun. 2, 1987

[54] SCALE WITH LOAD BED SUPPORTED BY IMPROVED LOAD UPRIGHTS

[75] Inventors: Konrad Backu, Albstadt; Adolf Ast, Messstetten; Herbert Mogg, Stetten, all of Fed. Rep. of Germany

[73] Assignee: August Sauter GmbH, Ebingen, Fed. Rep. of Germany

[21] Appl. No.: 776,440

[22] Filed: Sep. 16, 1985

[30] Foreign Application Priority Data

Sep. 14, 1984 [DE] Fed. Rep. of Germany ....... 3433829

[51] Int. Cl.$^4$ ............................................ G01G 21/10
[52] U.S. Cl. ............................... 177/187; 177/DIG. 9
[58] Field of Search ........................... 177/187, DIG. 9

[56] References Cited

U.S. PATENT DOCUMENTS 4,489,797 12/1984 Gordon .......................... 177/187 X Primary Examiner—George H. Miller, Jr.
Attorney, Agent, or Firm—Holman & Stern

[57] ABSTRACT

To support the load bed of a scale on the load lever, the invention provides load uprights each having a relatively rigid central section and elastic load-bearing end sections. The end sections are inserted in cup-shaped support seats on the load bed and the load lever respectively.

9 Claims, 6 Drawing Figures

SCALE WITH LOAD BED SUPPORTED BY IMPROVED LOAD UPRIGHTS

BACKGROUND OF THE INVENTION

This invention relates to a scale having a load bed which is supported, directly or indirectly by load supporting members on one or more load levers which transmit force from the load bed to a measuring device.

In a platform scale having a flat load bed and a measuring device acted upon by a load lever, generally the load bed is supported on the load lever system at its four corners. The quality of support appreciably affects the measuring properties of the scale, and the strength and sturdiness of the scale in operation.

Known types of load supporting members for transmitting forces acting on the load bed to the load lever system are the swinging-lever hanger type, the spherical support type, and the swinging-lever upright type. In all these types of load supporting member, the support elements are generally made of metal. The contact surfaces must accordingly undergo costly machining (grinding and polishing) and require frequent maintenance in the form of greasing and cleaning. In addition, in all cases the support in the vertical direction is rigid, so that vertical impacts which can occur, for example, when a load is set down abruptly on the load bed, are transmitted undamped to the load lever. Such sudden loading of the load lever system can cause damage. In addition, deflections of the load bed in the horizontal direction can give rise to a persistent rocking of the load bed, which makes operation difficult.

It is known to employ a cylindrical elastomeric piece in a load supporting member (load upright) with the elastomeric section sandwiched between metal discs comprising end members of a three-layer load upright structure. In this arrangement, one end member is a flat metal plate rigidly attached to the load bed, and the opposite end member is in the form of a metallic cone which rests in a matching depression in the load lever system. In such a load upright attached to the load bed (or to the load lever system) at least at one end of the load upright, the stiffness in the vertical direction is not appreciably greater than the stiffness in the horizontal direction. If a relatively soft load upright is used, vertical compression of the load bed is too great; and if a relatively hard load upright is used, there is little shock absorption in the horizontal direction, so that side forces on the load bed are transmitted to the load lever system via the load upright, and may damage the load lever system.

Accordingly, an object of the present invention is to provide a load supporting member (load upright) construction which affords greater protection for the load lever system of the scale than in known arrangements, and which is simple and easy to manufacture and maintain.

SUMMARY OF THE INVENTION

According to the invention, preferably both, but at least one, of the end members of otherwise rigid load uprights, as aforesaid, are made of elastomeric material. The shape and the material of the elastomeric end members of the load uprights preferably are such that there is a one-to-one directly proportional relationship between the vertical force of a load on the load bed and the vertical spring excursion or compression of the load bed on the elastic members. If the vertical force and the vertical spring excursion are proportional within the weighing range, then particularly simple registration conditions result.

The central part of the load uprights may be of metal, with the end members (or end member) made of an elastomeric material. Alternatively, the central part may be made of a relatively rigid and hard plastic material, with the end members (or end member) comprised of softer plastic materials. Another alternative is for the load upright to be formed end-to-end of the same elastomeric material, with the central portion of the upright enclosed in a metal sleeve to provide the central portion with the necessary stiffness.

In all the above cases, the load upright, which is inserted freely (i.e., not connected in any way) between the load bed and the load lever system or between the load bed and an intermediate support, has a relatively rigid metal portion with elastic end members. Since the weighing forces are exerted on the elastic end members, the previously required precision machining involved in manufacturing may be dispensed with. Because no hard surfaces rest against each other, the wear is also low. Further, substantially no maintenance or cleaning is required. Accordingly, manufacturing and operation are simplified.

Furthermore, the resilient compression of the load uprights provides protection against overloading of the load lever system. By suitably limiting the vertical compression available in the elastic end members, the load bed can be arranged to simply come to rest on the base frame when an overload occurs. Further, horizontally acting forces are quickly damped, and bring about a tilting movement of the load uprights accompanied by local compression of the elastic end members, resulting in strong damping of horizontal impacts. Under horizontal overload conditions, the load bed is deflected sideways until it comes to rest against the base frame of the scale. The load support system is thus functionally effective while providing effective overload protection of the load lever system against hard or shock loading of an item being weighed, as well as against horizontal impact on the load bed. Moreover, the effects of horizontal impacts are rapidly damped. When the load is removed, the load frame returns to its original position.

Preferably, the load supporting members are of a cylindrical shape. In this form they are easily manufactured, and they react uniformly to horizontal stresses regardless of the direction of application. This also applies in the case of simultaneous application of vertical and horizontal forces.

The load upright structure can be further buttressed if the elastic end (or ends) of the load supporting members is, or are, inserted in a dish-shaped support seat or seats. This can be employed to provide a predetermined deformation progression of the elastic ends despite the fact that according to the invention the load supporting members rest loosely against the load bed, the intermediate support, or the load lever system, and at the same time to provide a certain degree of positive location of the load supporting member on the load bed and the intermediate support, or on the load bed and the load lever system. For this purpose the dish shaped support seats may be affixed to the load bed, the load lever, or the intermediate support.

Further improvements in functioning of the dish-shaped support seat may be provided if the latter surrounds the load upright to a significant longitudinal extent. For a cylindrical load upright, the dish shaped support seat thus has a soup bowl shape with a conical edge region joining the base to a cylindrical upright wall. This results in centering of the load upright in the dish shaped support seat. The diameter of the end member should, for this purpose, be at least equal to and preferably slightly larger than the minimum diameter of the truncated-cone-shaped dish-shaped support seat.

Apart from the simple and easy manufacture and maintenance free operation of the inventive system, the transmission of force from the load bed to the load lever system is substantially free of problems and protected against overload.

Additional details, advantages, and features of the invention will be apparent from the following description and claims read in conjunction with the accompanying drawings. Any disclosure in the drawings not further described herein is expressly incorporated by reference.

DESCRIPTION OF PREFERRED EMBODIMENTS

Figure 1:
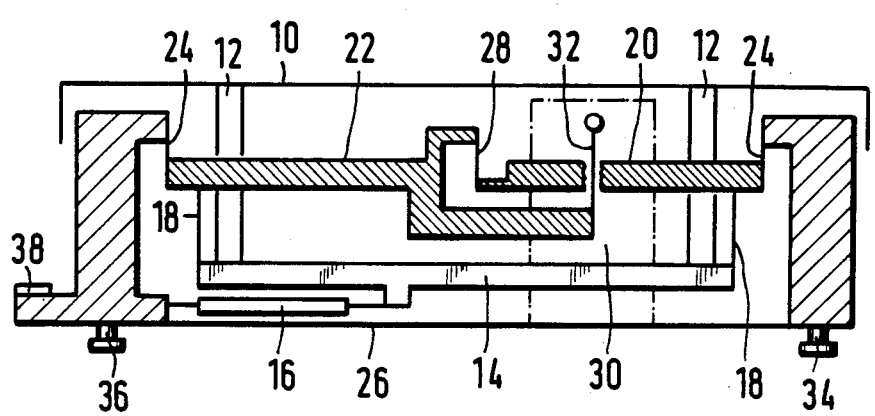
FIG. 1 is a cross sectional schematic view of a scale in which load uprights in accordance with the invention may be employed.

A platform-type scale has a load bed 10, FIG. 1, for receiving the weighing load, and which is supported on an intermediate support 14 via load uprights 12. Horizontal movements of the intermediate support 14 are hindered by means of a link rod 16 provided with elastic joints.

The load transmitted to the intermediate support 14 via the load uprights 12 is further transmitted to two load levers 20 and 22 via elastic straps 18. Each of the load levers 20 and 22 is mounted on the base frame 26 via an elastic strap 24, and the two load levers are joined together in the center of the scale by means of an elastic coupling 28. Load lever 22 has an extension member which provides a connection with a measuring cell 30 via another elastic coupling 32. The measuring cell 30 can have a structure of known form.

A base frame 26 of the scale is supported on underlying surface by supporting feet 34, 36. A level 38 provides means for monitoring leveling of the scale by means of the adjustable feet.

Figure 2:
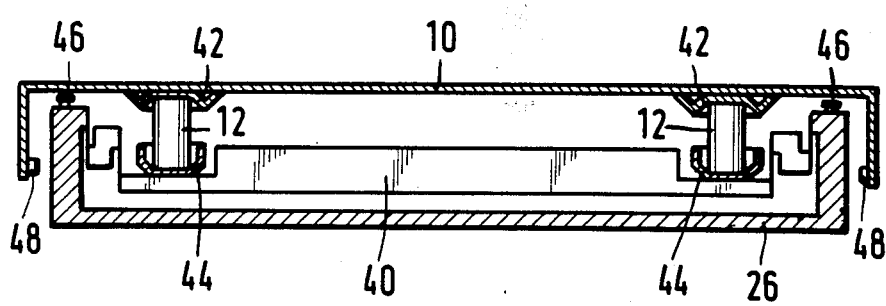
FIG. 2 is a simplified illustration of an embodiment of a load bed supporting system for a platform scale in accordance with the invention.

FIG. 2 shows a simplified version of a weighing system, for the purpose of illustrating the inventive load uprights 12. As in FIG. 1, the load bed 10 transmits forces to a load lever system 40 via the load uprights 12. In turn, the load lever system 40 is suspended from the base frame 26. The exact structure of the load uprights 12 will be described in detail below, with reference to the subsequent figures. The upper ends of the load uprights 12 are inserted in support seats 42 in which they are freely movable, and the lower ends of the load uprights are inserted in cup-shaped members 44, in which they are also freely movable. Support members 44 are affixed to the load lever system 40 or to the intermediate support 14 (FIG. 1).

It is seen that the support seats 42 are shaped like truncated cones opening downwards, with the approximate configurations of inverted soup bowls. The upperwardly opening cup-shaped support members 44 each have an upwardly extending cylindrical portion which extends upwardly to a level close to the longitudinal center of the load uprights 12, or at least to a level of 30 percent of the overall height of the uprights.

FIG. 2 additionlly shows overload detents 46 disposed on the top surfaces of the base frame 26 in the region of movement of the load bed 10, and also side detents 48 on the inner sides of the downwardly bent side edges of the platform-like load bed 10, which side detents project toward the base frame 26.

Figures 3, 4:
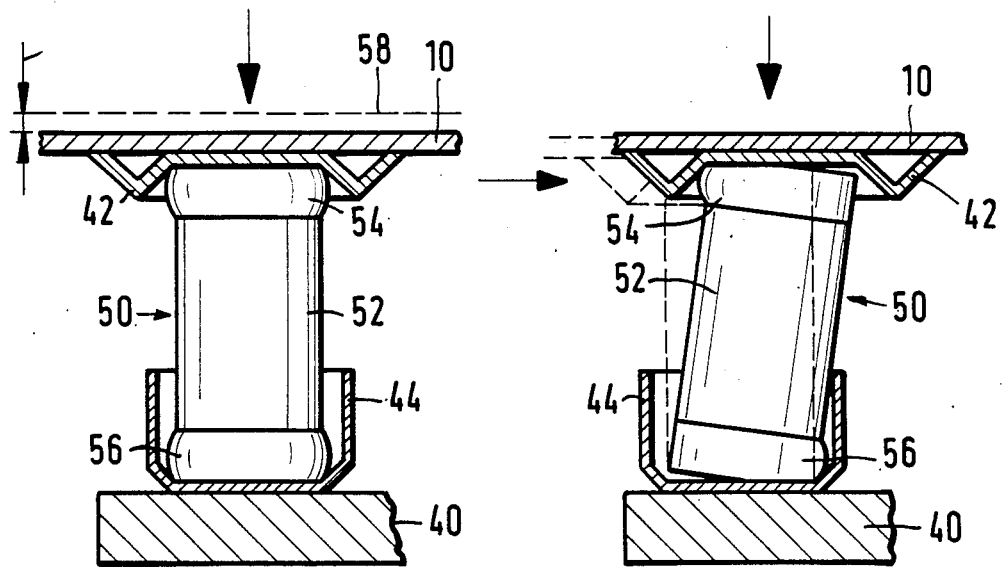
FIG. 3 is an elevational view to a larger scale of a load upright when a vertical force is being exerted on the load bed.
FIG. 4 is a view similar to FIG. 3 for a case where both a vertical force and a horizontal force are exerted on the load bed.

FIG. 3 illustrates a first form of load upright 50, which is being subject to a purely vertical load force.

The load upright 50 is formed of a cylindrical metal part 52, comprising a central section of the upright, and attached to part 52, a circular end member 54 disposed against the load bed 10, while a similar circular end member 56 is disposed against the load lever system 40 on the other end of the part 52. The circular end members 52 and 54 are made of elastomeric material and are of the same diameter as the cylindrical metal part 52 when in the unstressed state. Obviously, another relatively hard meterial, for example high strength plastic, may be substituted for the metal in the cylindrical part 52, and the respective parts of the load uprights may be secured by any known conventional means.

The dimensions (diameter and height) of the metal part 52 and of the end members 54 and 56 as well as the hardness of the elastomers used in the end members, are such that a given vertical force gives rise to a specific vertical spring excursion or resilient compression of the end members (FIG. 3) such that there is a one-to-one relation between the vertical force and the vertical spring excursion. The vertical compression is indicated by the distance between the rest position of the top extremity of the load bed 10 (dashed line 58) in the zero-load state, and the loaded position illustrated in solid line.

It can also be seen from FIG. 3 that the circular base plate of the downwardly opening truncated-cone-shaped support seat 42 on the load bed 10 and the circular base plate of the cup-shaped support member 44 which latter member is similarly shaped in its base region on the load lever system 40, have the same diameter as the load upright 50, and as the elastic end members 54 and 56 of the upright. When the scale is not under load, this arrangement causes the load uprights 50 to be centered, via the effects of the conical edge regions of the support seats 42 and the cup-shaped support members 44.

FIG. 4 shows the embodiment according to FIG. 3 when a vertical and horizontal force are active. The horizontal force component causes the load uprights 50 to tip. Thus, the load bed 10 can be deflected sideways by horizontal forces much smaller than the vertical forces needed to compress the end members 54 and 56. When the vertical and horizontal forces are removed, the uprights return to their original state, as a result of the elasticity of the end members 54 and 56.

The illustrated structure of load uprights having rigid center parts and elastic end members enables the load uprights to be many times stiffer in the vertical direction than in the horizontal direction. The following are examples of attainable parameters for the load uprights 50:

Vertical: 600 kg force yields 3 mm spring excursion.
Horizontal: 20 kg force yields 5 mm deflection.

Such values cannot be attained for load uprights of the known type, and the load uprights 50 accordingly have a significantly favorable effect on the measuring characteristics, strength, and sturdiness of the scale.

Figures 5, 6:
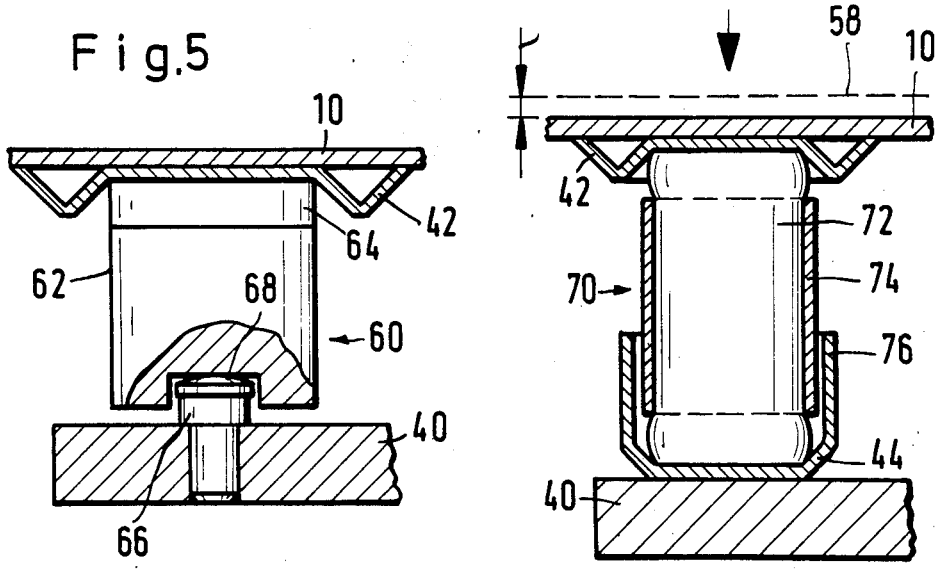
FIG. 5 is an elevational view of a further form of load upright having only one end in the form of an elastic end member.
FIG. 6 is a similar view of still another form of load upright.

FIG. 5 shows a second form of load upright 60 having a cylindrical metal part 62 with a single elastomeric end member 64 on the end of part 62 which is inserted in support seat 42 on the load bed 10. End member 64 is shown in FIG. 5 in the zero-load state. It is readily appreciated that the diameter of the cylindrical load upright 60 matches the diameter of the circular horizontal base plate of the support seat 42. On the opposite end, the load upright 60 is supported against the load lever system 40 by a hard point-support comprising an upright member 66 which projects upwardly from the load lever system 40 into a recess in the foot of the load upright 60. Upright member 66 has a support head 68 in the form of a part spherical cap.

FIG. 6 is an illustration similar to FIG. 3 showing a third form of load upright. Here, the load upright 70 is formed of a solid cylindrical piece 72 of elastomeric material, the central section of which is surrounded and stiffened by a hollow metal cylinder 74. The projecting ends of the elastomeric part 72 which are disposed outside the metallic cylinder 74 provide the necessary elasticity to produce the previously described resilient compression of the load upright. It is evident that this embodiment is particularly simple and easy to manufacture.

It is also seen in FIG. 6 that the cup-shaped support member 44 has a cylindrical portion 76 which extends upwardly from the truncated-cone-shaped lower part of member 44 which lower part is attached to the load lever system 40, the inner diameter of portion 76 being greater than the outer diameter of the hollow metallic cylinder 74. This diameter difference is just sufficient such that tipping motion is available to the extent that the side detents 48 (FIG. 2) engage the base member 26. The diameter difference need not be greater, since additional tipping motion beyond this position is not possible. The engagement of the side detents 48 against member 26 reliably protects the load upright 70 and similarly the load upright 50 according to FIG. 3 from tipping over.

While only preferred embodiments of the invention have been described herein in detail, the invention is not limited thereby and modifications can be made within the scope of the attached claims.

We claim:

1. A scale having a load transmitting element, a load receiving element, and load uprights interposed between said elements, wherein each load upright has a rigid central portion and elastic end portions integral with the central portion, the end portions being received in a freely movable manner in respective concave seats on the respective load elements for resilient deformation of the end portions when load is applied to the transmitting element.

2. A scale according to claim 1, wherein the rigid portion of each load upright comprises a metal piece and each end portion is an elastomer.

3. A scale according to claim 1, wherein the rigid portion of each load upright is formed of relatively hard plastic material and each end portion is formed of softer plastic material.

4. A scale according to claim 1, wherein each load upright comprises an integral element of elastomeric material with a rigid metal tube fitting around the center thereof to form the rigid central portion.

5. A scale according to claim 1, wherein the load uprights are cylindrical in shape.

6. A scale according to claim 5, wherein each seat has a cylindrical wall extending at least to one-third the height of the respective load upright.

7. A scale according to claim 6, wherein each cup-shaped seat has a frustoconical wall portion connecting a base wall thereof to the cylindrical wall.

8. A scale according to claim 7, wherein the diameter of the end portion of each load upright is substantially equal to the diameter of the base wall of the respective seat.

9. The invention of claim 1, wherein the load transmitting element is a load bed of the scale and the load receiving element is one of a load lever and an intermediate support.

* * * * *